United States Patent
Tran et al.

(10) Patent No.: US 7,814,354 B2
(45) Date of Patent: Oct. 12, 2010

(54) METHOD AND APPARATUS FOR REGULATING TRANSCEIVER POWER CONSUMPTION FOR A TRANSCEIVER IN A COMMUNICATIONS NETWORK

(75) Inventors: Hoang Tan Tran, San Diego, CA (US); Mark Berman, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 836 days.

(21) Appl. No.: 09/886,859

(22) Filed: Jun. 21, 2001

(65) Prior Publication Data

US 2002/0019954 A1    Feb. 14, 2002

Related U.S. Application Data

(60) Provisional application No. 60/213,140, filed on Jun. 22, 2000.

(51) Int. Cl.
    *G06F 1/32*          (2006.01)
(52) U.S. Cl. ................... 713/324; 713/300; 713/320; 713/323
(58) Field of Classification Search .......... 713/300, 713/320, 324, 1, 322, 323; 370/311, 318
See application file for complete search history.

(56) References Cited

U.S. PATENT DOCUMENTS

| | | | |
|---|---|---|---|
| 5,095,308 A | 3/1992 | Hewitt | |
| 5,790,946 A | 8/1998 | Rotzoll | |
| 6,026,494 A | 2/2000 | Foster | 713/320 |
| 6,215,764 B1 * | 4/2001 | Wey et al. | 370/216 |
| 6,442,142 B1 * | 8/2002 | Bar-Niv | 370/252 |
| 6,678,728 B1 * | 1/2004 | Uppunda et al. | 709/222 |
| 6,691,233 B1 * | 2/2004 | Gannage et al. | 713/300 |
| 7,058,833 B1 * | 6/2006 | Bremer et al. | 713/324 |

OTHER PUBLICATIONS

XP000502465: "Power Management Method for Portable Personal Computer With Modem." vol. 38, No. 2, Feb. 1995.

* cited by examiner

*Primary Examiner*—Thomas Lee
*Assistant Examiner*—Paul B Yanchus, III

(57) ABSTRACT

A method and apparatus for regulating transceiver power consumption for a transceiver in a communications network. Data received by the transceiver is monitored to detect the presence or absence of a received data signal. A transceiver state machine is controlled to regulate transceiver power consumption in response to the presence of absence of the data received.

12 Claims, 6 Drawing Sheets

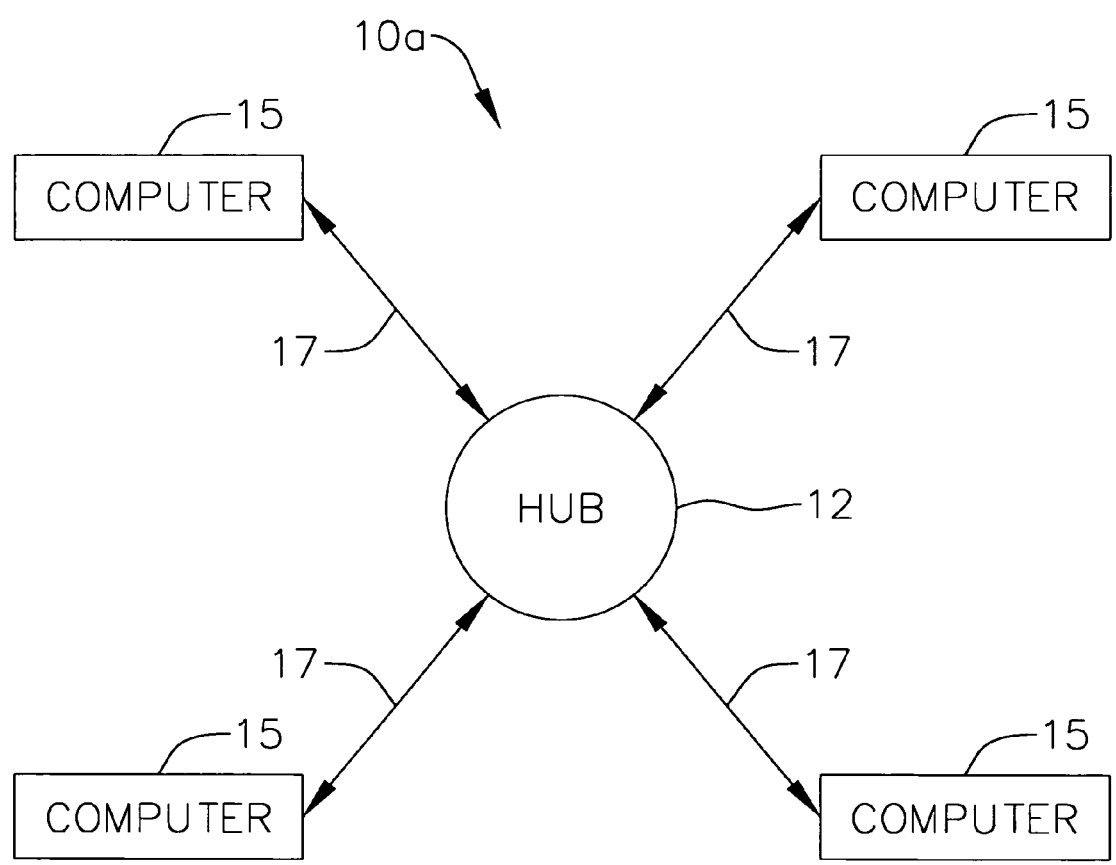
*FIG.1α*

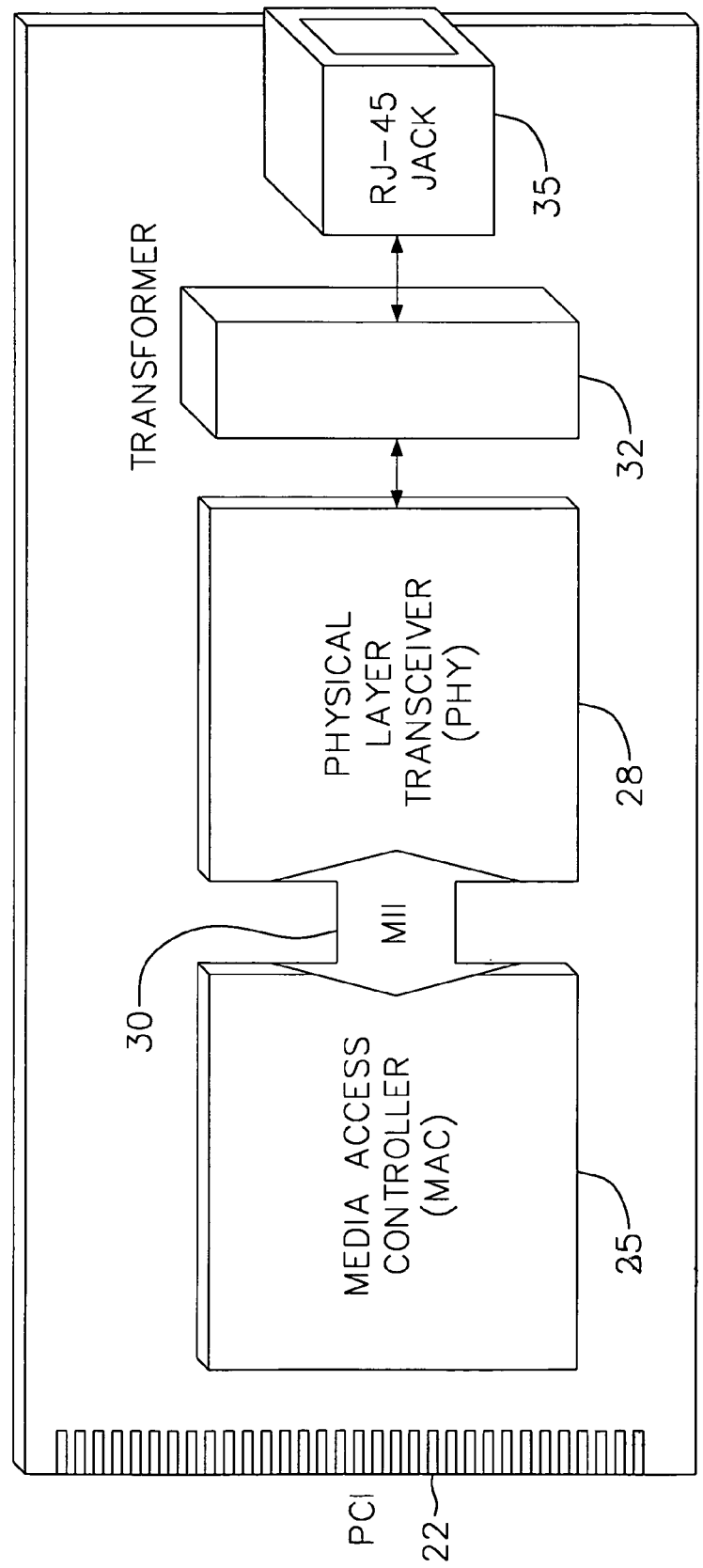

US 7,814,354 B2

METHOD AND APPARATUS FOR REGULATING TRANSCEIVER POWER CONSUMPTION FOR A TRANSCEIVER IN A COMMUNICATIONS NETWORK

CROSS-REFERENCE TO RELATED APPLICATION(S)

This application claims priority from provisional U.S. application Ser. No. 60/213,140, filed Jun. 22, 2000, the entire contents of which are incorporated herein by reference.

BACKGROUND OF THE INVENTION

The present invention relates generally to the field of communications networks, and, in particular, to a power regulating method and apparatus useable by a communications network transceiver for regulating power consumption of the transceiver.

Ethernet is a widely used technology in local area networks (LAN) and other computer networks. The Institute of Electrical and Electronics Engineers (IEEE) published the 802.3 standard to support the development of communication systems using Ethernet technology. The IEEE 802.3 standard, commonly referred to as 802.3 CSMA/CD or the Ethernet standard, has also been adopted by the International Organization for Standardization (ISO), making the IEEE 802.3 standard a worldwide standard.

Computers connected to an Ethernet LAN typically require an Ethernet transceiver to transmit and receive signals between a computer and the network. The transceiver is typically part of a network interface card (NIC) such as a PCM-CIA/Cardbus card or is coupled to the computer processor. Ethernet transceivers typically draw current from the computer's power supply during operation. As Ethernet transceivers generally consume a substantial amount of electrical energy, a problem is encountered with Ethernet transceivers when used in conjunction with portable or laptop computers. When users transport their portable computers, users typically do not remove their network interface card. Therefore, when a user is operating the portable computer, the Ethernet transceiver will typically continuously check for a signal from the network, drawing power from the battery, unnecessarily shortening the life of the battery, and, thereby, shortening the amount of time a user may operate their portable computer without replacing or replenishing their battery. Alternatively, when a user is remotely connected to an Ethernet network, long periods of time may pass when the NIC is inactive and not transmitting or receiving signals from the network. During this time, the Ethernet transceiver unnecessarily draws power from the battery, again shortening the life of the battery and user operation time.

Others have attempted to solve these problems. For example, U.S. Pat. No. 6,026,494, issued to Foster, discloses a driver including an algorithm for reducing power consumption when a computer is physically disconnected from a network. The invention in Foster, however, has many shortcomings. The driver of Foster is purely software driven and, therefore, is slower in response to network signals. Additionally, the driver in Foster is not universally adaptable but must be designed for the particular network interface card that is being used. Additionally, the transceiver being used must have specific hardware to support the driver that is not standard on transceivers.

Therefore, a need exists for a device that solves the above discussed problems associated with communication and power consumption of Ethernet transceivers. The present invention provides a solution to the above problems.

SUMMARY OF THE INVENTION

In accordance with the present invention a method and apparatus for regulating transceiver power consumption for a transceiver in a communications network is provided. Data received by the transceiver is monitored to detect the presence or absence of a received data signal. A transceiver state machine is controlled to regulate transceiver power consumption in response to the presence or absence of the data received.

BRIEF DESCRIPTION OF THE DRAWINGS

FIGS. 1a and 1b are overview block diagrams of typical Ethernet communications networks within which the present invention can operate;

FIG. 2 is a schematic block diagram of a Network Interface Card (NIC);

DETAILED DESCRIPTION OF THE INVENTION

Figure 1B:
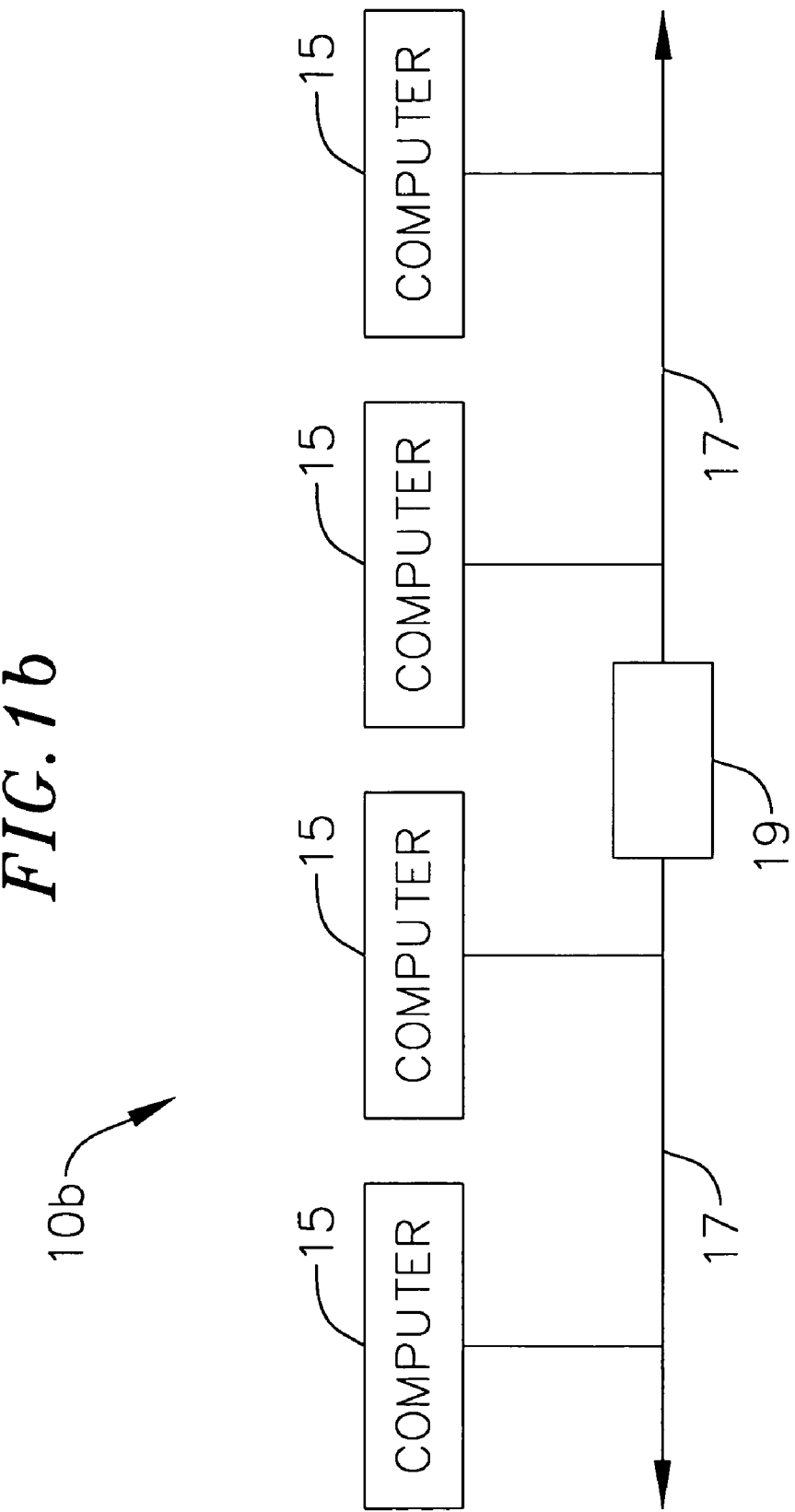

A communications system which may incorporate the features of this invention is generally indicated at 10a in FIG. 1a and may incorporate the architecture of a multi-step, multi-hub network for Ethernet. The system 10a includes hub 12 and plurality of computers 15 serviced by hub 12 forming a local area network (LAN). Four computers 15 are shown by way of illustration but a different number of computers may be used without departing from the scope of the invention. Each of computers 15 is displaced from hub 12 by any distance supported by the associated hardware and power supply. Computers 15 may also be displaced from each other.

Hub 12 is connected to each of computers 15 by communications line 17. Communication line 17 includes a plurality of unshielded twisted pairs of wires or cables. Generally, the wires or cables are formed from copper. Four unshielded twisted pairs of wires are provided in system 10a between each computer 15 and hub 12.

System 10a shown in FIG. 1a is operative with several categories of twisted pairs of cables designated as categories 3, 4 and 5 in the telecommunications industry. Category 3 cables are the poorest quality (and lowest cost) and category 5 cables are the best quality (and highest cost).

A similar Ethernet based communication system 10b is depicted in FIG. 1b, wherein computers 15 form a LAN utilizing communication lines 17 connected by repeater 19. Repeater 19 allows for the extension of the communication system over communication lines 17.

Computers 15 depicted in FIGS. 1a and 1b may be desktop computers or laptop computers. Accordingly, the present invention is particularly useful for portable computers which are not directly connected to a power supply and power conservation is more important.

Each computer is coupled to communication line 17 of the communication system of FIGS. 1a and 1b by way of a Network Interface Card ("NIC"). FIG. 2 is a schematic block diagram of conventional NIC 20. NIC 20 generally includes media access controller ("MAC") 25, physical layer transceiver ("PHY") 28, PCI bus connector 22, media independent interface ("MII") 30, transformer 32, and RJ-45 jack 35. NIC 20 is coupled to the computer using PCI bus connector 22 to transmit information between the computer and NIC 20. MAC 25 communicates with the computer over PCI bus connector 22. MAC 25 is capable of processing and creating Ethernet frames for transmission using MAC protocol. Data is sent from MAC 25 to PHY 28 over MII 30 which is a standard bus for communications between MAC 25 and PHY 28. PHY 28 converts signals received from MII 30 into an analog format that can be sent to other computers on the communications network. MAC 25 and PHY 28 may each be physically separate chips or alternatively, MAC 25, PHY 28, and MII 30 may all be incorporated on a single device. Transformer 32 is used to amplify the signal before it is transmitted to the communications network. RJ-45 jack 35 is the standard jack for coupling a twisted pair cable to NIC 20, however, other suitable jacks or coupling methods may be used.

Figure 3:
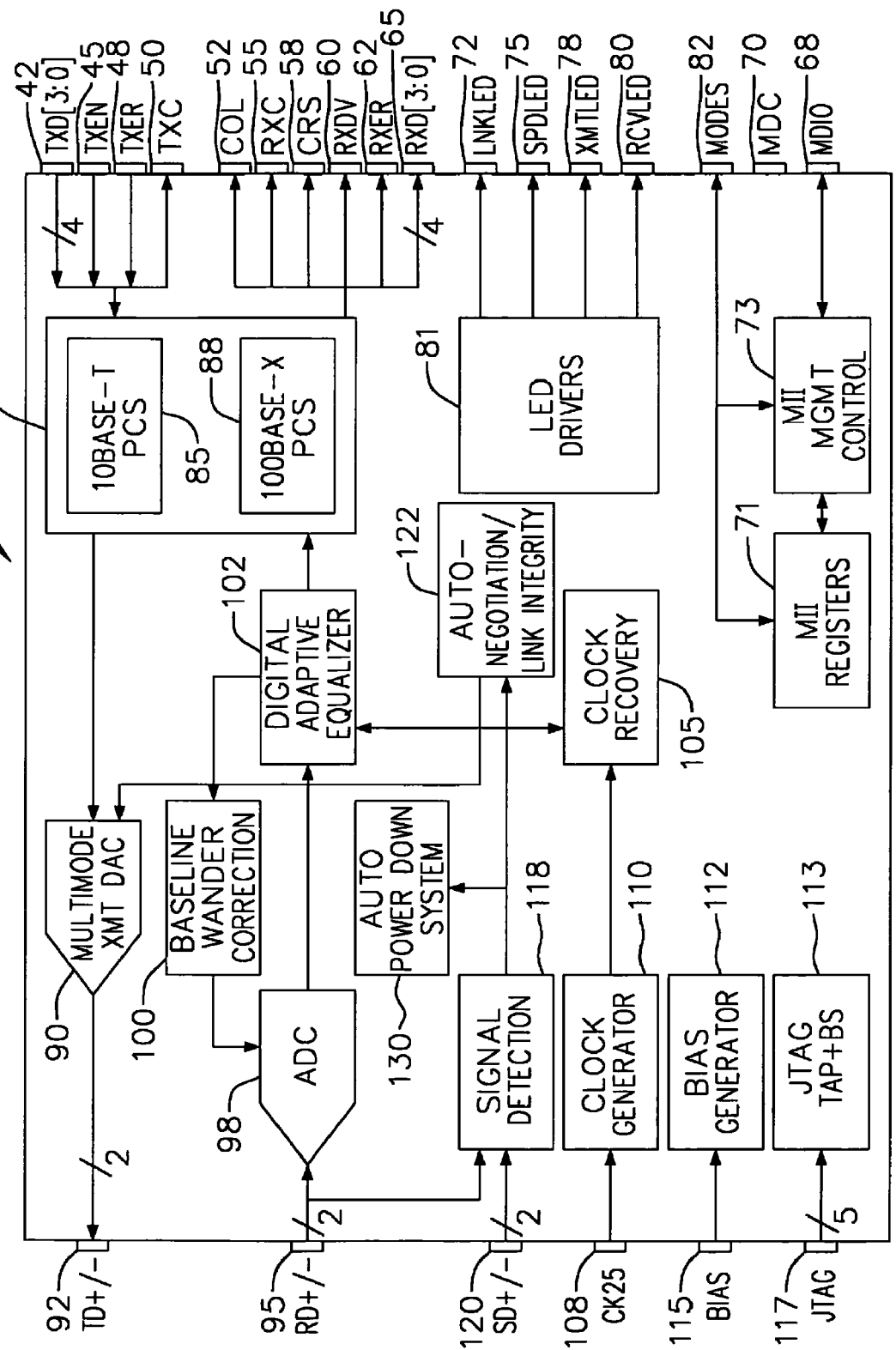
FIG. 3 is schematic block diagram of an exemplary embodiment of an Ethernet transceiver.

FIG. 3 is schematic block diagram of an exemplary embodiment of Ethernet transceiver PHY 28 incorporating the present invention. The auto power down system can be implemented on, for example, a 10/100 Ethernet transceiver from Broadcom Corporation having model number BCM5226, a single-chip device containing six independent transceivers, each of which implement Ethernet transceiver PHY 28.

Ethernet PHY transceiver 28 includes connections for the transmission of standard MII signals, including transmit data ("TXD") 42, transmit enable ("TXEN") 45, transmit error ("TXER") 48, transmit clock ("TXC") 50, collision detect ("COL") 52, receive clock ("RXC") 55, carrier sense ("CRS") 58, receive data valid ("RXDV") 60, receive error ("RXER") 62, receive data ("RXD") 65, management data input/output ("MDIO") 68, and management data clock ("MDC") 70. The transceiver may be configured with a number of light emitting diodes ("LEDs") that indicate a particular operating state of the transceiver, including link LED 72, on when the transceiver is in communication with another device over a communication network, speed LED 75, indicating 10 Megabit or 100 Megabit operation, transmit LED 78, on when transmitting data provided by the MAC, and receive LED 80, on when receiving data over the communications system. The LEDs are coupled to one or more LED drivers 81. MODES port 82, MII REGISTERS 71, MII MANAGEMENT CONROL 73, MDC clocking port 70 and MDIO 68 provide serial control interfaces between the transceiver PHY and MAC.

Ethernet transceiver PHY 28 has physical coding sublayer ("PCS") 83 including both 10Base-T PCS 85 and 100Base-X PCS 88 for transmitting signals. Either sublayer will operate depending on the type of signal received by the transceiver. Signals received by PCS 83 are then converted into analog signals and sent to multimode transmit digital analog converter ("the transmitter") 90. The signals may then be sent through transmit data ("TD") connector 92 to transformer 32 and RJ-45 jack 35 as shown in FIG. 2 for transmission on the communication network.

Data received through receive data ("RD") connector 95 is sent to analog-to-digital converter ("ADC") 98. Before the data is sent to appropriate PCS 83 baseline wander correction 100, digital adaptive equalizer 102, and clock recovery 105 operate to locate an optimal location where the data received should be captured. Digital adaptive equalizer 102 may find the maximum signal location determining exactly where ADC 98 should capture the data. The data is then sent to PCS 83 where the data is converted into the appropriate format for transmission to the MAC as is shown in FIG. 2.

A clock signal is transmitted through CK25 connector 108. The clock is received at a fixed frequency, for example 25 Mhz. However, a clock generator 110 is used to create a clock operating internally at different frequencies such as, for example, 125 Mhz, 40 Mhz, or 50 MHz. Every component of Ethernet transceiver PHY 28 may be responsive to the transmitted clock.

Bias generator 112 may generate a current, received through bias connector 115, for all analog components in the Ethernet transceiver PHY 28 requiring a current supply.

Ethernet transceiver PHY 28 may include and run JTAG test module 113 utilizing JTAG port 117 in order to test the board connections and solder connections.

In an exemplary embodiment, signal detection 118 is responsive to a receive data signal received from the communications system through RD connector 95. In an another embodiment, signal detection 118 may be responsive to a fiber optic signal received through SD connector 120. Auto-negotiation/link integrity component 122 may receive the signal from signal detection 118 and determine if the signal is sent from a system that is compatible with the present transceiver. If the two systems are compatible, for example, both 10Base-T or both 100Base-X, auto-negotiation/link integrity component 122 will verify that the link is valid and negotiate a link between Ethernet transceiver PHY 28 and the other device on the communications system. Auto-negotiation/link integrity component 122 is coupled to multi-mode transmitter/digital-to-analog converter (DAC) 90 so it may send signals back across the communications system.

Signal detection 118 may also send the received signal to auto power down system 130. Auto power down system 130 is coupled via power control lines to every component of the transceiver and may control whether the component is drawing current from the computer power source. The auto power down system sends one or more power control signals to components of the transceiver to control whether the component is drawing current. For example, a power control signal can transmit either an on or off signal. A '0' may indicate that the component should draw current from the computer power source (i.e. be in an "on" state), and a '1' may indicate that the component should not draw current from the computer power source (i.e. be in an "off" state). Every component of the transceiver is responsive to and draws current based on the power control signal. The power control signal is continuously transmitted to the components of the transceiver. The receiving component will either begin drawing current or stop drawing current from the computer power source in response to the power control signal.

Figure 4:
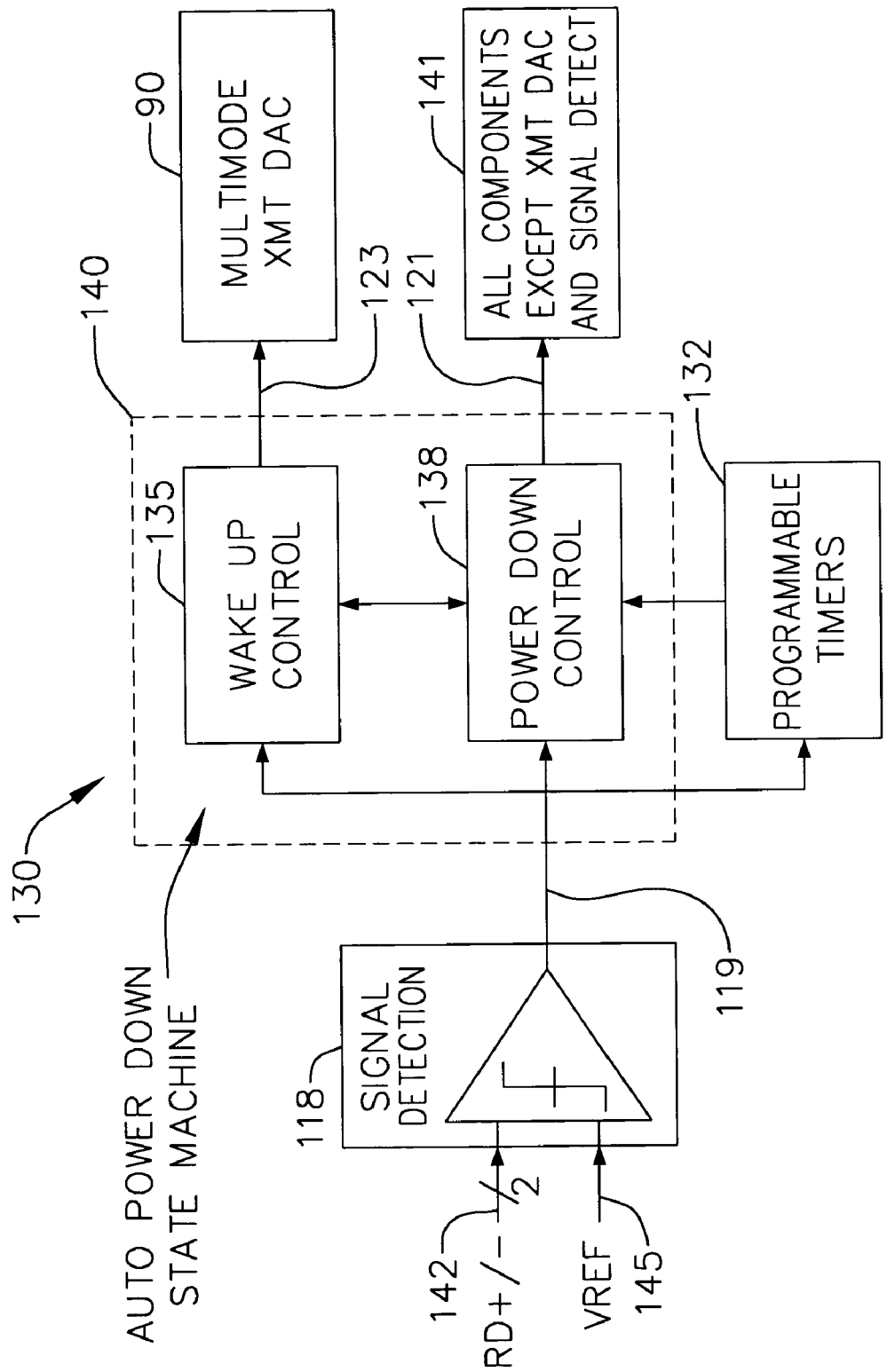
FIG. 4 is a schematic block diagram of an auto power down system.

FIG. 4 is a schematic block diagram of auto power down system 130. In an exemplary embodiment, auto power down system 130 may include one or more programmable timers 132, wake-up control 135, and power down control 138. Auto power down system 130 is responsive to signal detection 118, which may be the same signal detection 118 that is utilized by the other components of Ethernet transceiver PHY 28. Wake-up control 135 and power down control 138 are part of auto power down state machine 140. Auto power down state machine 140 includes one or more logic circuits responsive to programmable timers 132 and energy detect signal 119 generated by signal detection 118. Wake-up control 135 sends power control signals 123 to transmitter 90. Power down control 138 sends power control signals 121 to all components or circuitry of the entire transceiver, except the transmitter and signal detection 118, depicted generally as block 141. The power control signal being sent is automatically determined in response to the presence or absence of an energy detect signal.

Signal detection 118 is responsive to RD signal 142 and reference voltage 145. Reference voltage 145 is provided by typical transceiver voltage sources associated with hardware components of the transceiver. The reference voltage may be set by programmable software or any suitable method. An exemplary reference voltage is about 325 millivolts and an exemplary voltage range of RD signal 142 may range from about 585 millivolts to about 3.1 volts. Signal detection 118 is responsive to any other range that is suitable for the particular transceiver being used. If the signal received has a magnitude, or absolute value, that is greater than the reference voltage, the signal detect interprets this situation as an "energy detect" and sends an energy detect signal 119 to auto power down state machine 140 and programmable timers 132. The state machine is responsive to both the energy detect signal and programmable timers 132. Programmable timers 132 are set using hardware logic or programmed using software or any other suitable method. In an exemplary embodiment, auto power down state machine 140 utilizes four timers, identified as time-1 (e.g., a predetermined short-time), time-2 (e.g., a predetermined long-time), time-3, (e.g., a predetermined longer-time) and time-4 (e.g., a predetermined wake-up-time). However, any number of programmable timers 132 may be used if different timing is desired for any of the states. Each timer is set to measure any desired period of time. In an exemplary embodiment, time-2 measures a shorter period of time than time-3, and time-1 measures a shorter period of time than time-2. In an exemplary embodiment, time-1, time-2, time-3, and time-4 are set to about 1 millisecond, about 1.342 seconds, about 5.368 seconds, and about 335 milliseconds, respectively.

Ethernet transceiver PHY 28 may be capable of operating in at least two modes, a "normal power operating mode" and a "minimized power operating mode". While in normal power operating mode, the computer may be connected to a power supply. When energy is detected on RD inputs, the entire transceiver will be activated and draw current from the computer power source. The transceiver will operate at the normal energy consumption level for the particular transceiver. Alternatively, the computer may not be connected to a power supply and may instead run off of battery supplied power. The entire transceiver may initially be activated and draw current from the computer power source. When the transceiver detects an absence of energy, the transceiver will operate in minimized power mode, regulating power consumption to be approximately less than five percent of the power required to operate the transceiver components.

Figure 5:
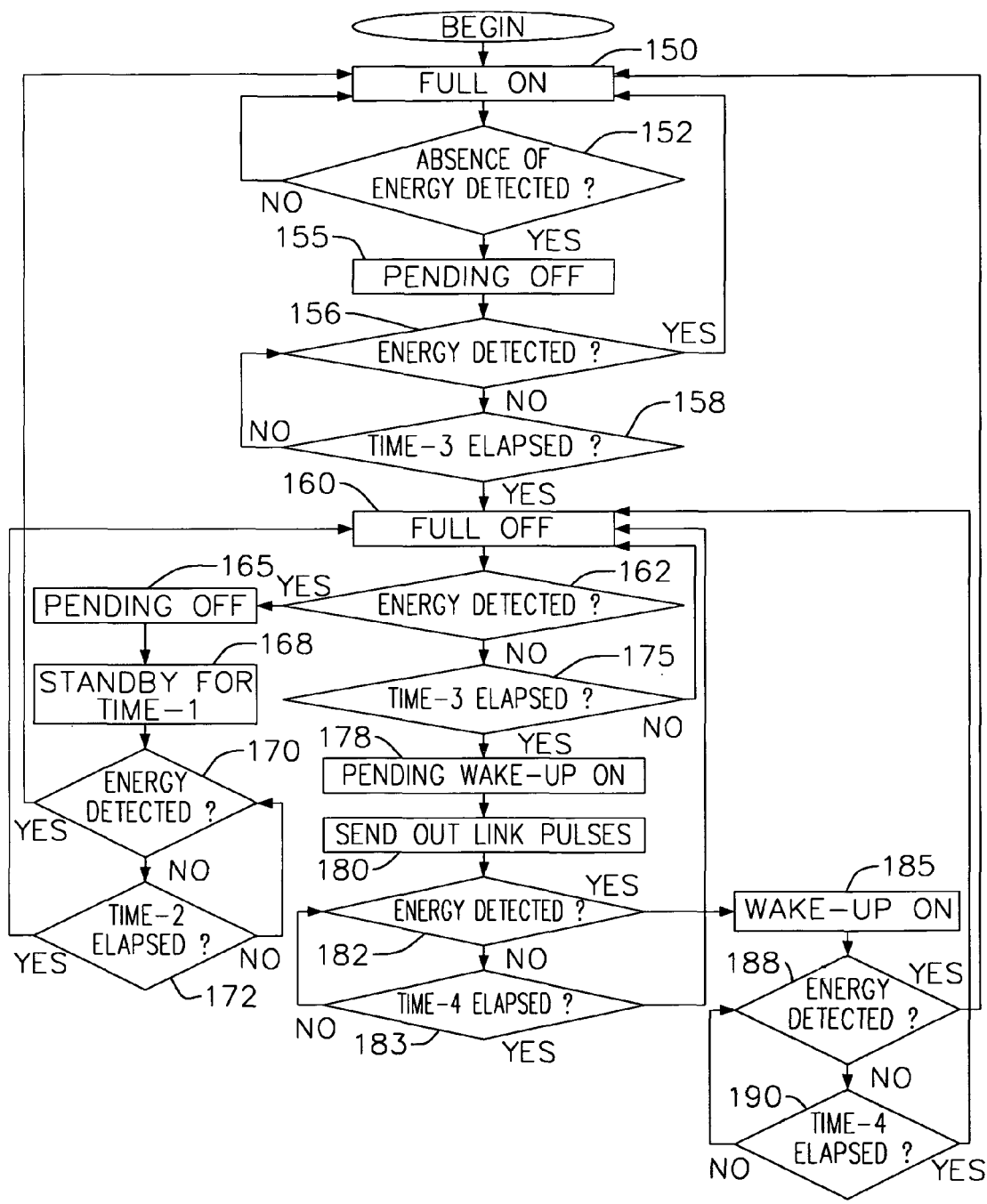
FIG. 5 is a flow chart diagram describing an exemplary embodiment of the operation of the auto power down state machine.

FIG. 5 is a flow chart diagram describing an exemplary embodiment of the operation of the auto power down state machine. The auto power down state machine has six states: full on; pending off; full off; pending on; pending wake-up on; and wake-up on.

In step 150, the auto power down state machine may initially begin in the full on state. In the full on state, the power control signals sent by wake-up control and power down control indicate "on" such that the entire transceiver, including all components and circuitry, draw current from the computer power source. In step 152, the state machine will determine if an absence of energy is detected. As long as energy is detected, the system will remain in the full on state, step 150. If there is an absence of energy detected, the system will enter the pending off state, step 155. No change in power control signals takes place in the pending off state. In step 156, the state machine will continue to determine if energy is detected.

If energy is detected, the system will return to the full on state and the timers will be reset. Otherwise, if the predetermined time period time-3 has passed without an energy detection, step 158, the system will enter the full off state, step 160. In the full off state, the power control signal sent by power down control indicates an "off" signal to every component of the transceiver except the transmitter and the signal detection. The power control signal sent by wake-up control also indicates an "off" signal to the transmitter.

While in the full off state, if energy is detected, step 162, the state machine will enter pending on state, step 165. The state machine may remain in the pending on state for at least time-1 before taking any action, step 168. The time-1 waiting period may be used for avoiding the false detection of energy that may be created by noise signals on the network. No change in power control signals takes place in the pending on state. In step 170, the state machine will determine if energy has been detected. If an energy detect signal is received, the system will return to full on state, step 150. However, if no energy is detected in time-2, step 172, the system will return to full off state, step 160. Also while in full off state, if no energy is detected for time-3, step 175, the system will enter the pending wake-up on state.

In the pending wake-up on state, the power control signal sent by wake-up control indicates an "on" signal to the transmitter so that the transmitter only will draw current from the computer power source, step 178. The state machine will then create and send link pulses to the device that the transceiver is connected to on the communications system, step 180. Link pulses are signals for auto-negotiation between two Ethernet devices as identified in the IEEE 802.3 standard. The device may be another computer, a hub, or other device on a communications system. If the device is active, it will send a signal back to the transceiver. If a signal is received by the transceiver, the state machine will interpret this as an energy detect. In step 182, if an energy detect signal is received, the state machine will enter the wake-up on state. Otherwise, if no energy signal is detected in time-4, step 183, the state machine will return to the full off state, 160.

In the wake-up on state, the power control signal sent by wake-up control indicates an "on" signal to the transmitter so that the transmitter only will draw current from the computer power source, step 185. If another energy detect signal is received, step 188, the system will return to the full on state, step 150. If no energy is detected in time-4, step 190, the system will return to the full off state, 160. The state machine may remain in the wake-up on state until either an energy detect signal is received or the time-4 timer expires.

The wake-up on state serves to increase energy conservation by the power down system. For example, while in the wake-up on state, time-4 may be of a relatively short duration as compared to time-3. Therefore, if the energy detected in the pending wakeup on state was not a true communication signal and another energy detect signal is not received by the state machine in a short period of time, the state machine will enter the full off state and current draw will be at a minimum. Alternatively, if the state machine directly enters the full on state from pending wake-up on, and no additional energy is detected, the transceiver may remain fully powered for the greater duration of time-3, therefore consuming more power and resulting in less power conservation. Time-4 may be varied depending on the amount of time needed for the connected device to receive the transmitted link pulses.

The auto power down system is capable of preventing a "lock-up" situation. If two devices in communication on a network both enter a "sleep" or minimized power mode, neither device will transmit signals across the network. In this situation, both devices require a signal or energy detect to be brought out of the power off mode. However, since both devices are in minimized power mode, neither device will receive a signal from the other device and a lock up situation will occur. The auto power down state machine is capable of preventing this lock-up state. In the pending wake-up on state, the state machine powers up the transmitter and sends out link pulses onto the network. If the connected device is in a power off mode, the link pulses will "wake up" the device. If the system detects energy in response to the link pulses, the system will return to the full on state and restore communication.

The pending wake-up on state requires a greater amount more power than the full off state since the transmitter must be operating to send signals out to a possibly connected device. Therefore, the time-3 timer may be set to control how often the pending wake-up on state is entered from the full off state. The more often the pending wake-up on state is entered, the more energy will be consumed. However, the chances of restoring a connection are also greater with the pending wake-up on state being activated at a greater frequency.

The description of an embodiment of present invention as set forth herein relates specifically to a 10/100 Base-TX/FX Ethernet transceiver and a suitable Ethernet system for the purposes of explanation and understanding of the invention. However, it will be understood that the concepts of this invention and the scope of the claims apply to communications systems other than that utilizing a 10/100Base-TX/FX transceiver. For example, the present invention may also be used with any type of transceiver, including gigabit Ethernet transceivers.

Although this invention has been described in certain specific embodiments, those skilled in the art will have no difficulty devising variations which in no way depart from the scope and spirit of the present invention.

It is therefore understood that this invention may be practiced otherwise than is specifically described. Thus, the present embodiments of the invention should be considered in all respects as illustrative and not restrictive.

What is claimed is:

1. A method of regulating transceiver power consumption for a transceiver in a communications network comprising:
   monitoring a data receiver to detect a received data signal; and
   controlling a transceiver state machine to regulate transceiver power consumption in response to the presence or absence of a received data signal;
   wherein the transceiver state machine comprises a full-on state during which a wake up control signal is sent to power on a transmitter and a power control signal is sent to power on the transceiver, a full-off state during which the wake up signal is sent to power off the transmitter and the power control signal is sent to power off the transceiver, and a pending wake-up on state during which the wake up control signal is sent to power on the transmitter and the power control signal is sent to power off the transceiver, and wherein the transceiver state machine is configured to:
   transition from the full-on state to the full-off state after failing to detect a received data signal for a period determined by a first timing circuit;
   transition from the full-off state to the pending wake-up on state after failing to detect a received data signal for an additional period determined by the first timing circuit; and
   transition from the pending wake-up on state to the full-on state after sending out a data link signal, detecting a first received data signal in response to the data link signal within a first period determined by a second timing circuit, and detecting a second received data signal after detecting the first received data signal within a second period determined by the second signal timing circuit.

2. The method of claim 1, wherein the transceiver state machine is further configured to transition from the pending wake-up on state to the full-off state after sending out the data link signal and failing to detect a first received data signal within the first period determined by the second signal timing circuit.

3. The method of claim 1, wherein the transceiver state machine is further configured to transition from the pending wake-up on state to the full-off state after sending out the data link signal, detecting the first received data signal in response to the data link signal within the first period determined by the second timing circuit, and failing to detect a second received data signal after detecting the first received data signal within the second period determined by the second signal timing circuit.

4. The method of claim 1, wherein monitoring a data receiver to detect a received data signal includes comparing a signal received from the communications network with a reference signal and determining a magnitude of the signal received from the communications network exceeds a magnitude of the reference signal.

5. The method of claim 1, wherein the transceiver state machine is further configured to transition from the full-off state to the full-on state after detecting a first received data signal within a period determined by a first timing circuit, waiting for a stand-by period determined by a third timing circuit, and detecting a second received data signal after the stand-by period but before a period determined by a fourth data timing circuit.

6. The method of claim 1, wherein the transceiver state machine is further configured to remain in the full-off state after detecting a first received data signal within a period determined by a first timing circuit, waiting for a stand-by period determined by a third timing circuit, and failing to detect a second received data signal after the stand-by period but before a period determined by a fourth data timing circuit.

7. A transceiver power consumption regulator for a transceiver in a communications network comprising:
   a data receiver located on the transceiver to detect a received data signal; and
   a transceiver state machine coupled between the data receiver and a transmitter to regulate transceiver power consumption of the transceiver in response to the presence or absence of a received data signal;
   wherein the transceiver state machine comprises a full-on state during which a wake up control signal is sent to power on the transmitter and a power control signal is sent to power on the transceiver, a full-off state during which the wake up signal is sent to power off the transmitter and the power control signal is sent to power off the transceiver, and a pending wake-up on state during which the wake up control signal is sent to power on the transmitter and the power control signal is sent to power off the transceiver, and wherein the transceiver state machine is configured to:
   transition from the full-on state to the full-off state after failing to detect a received data signal for a period determined by a first timing circuit;
   transition from the full-off state to the pending wake-up on state after failing to detect a received data signal for an additional period determined by the first timing circuit; and to transition from the pending wake-up on state to the full-on state after sending out a data link signal, detecting a first received data signal in response to the data link signal within a first period determined by a second timing circuit; and detecting a second received data signal after detecting the first received data signal within a second period determined by the second signal timing circuit.

8. The transceiver power consumption regulator of claim 7, wherein the transceiver state machine is further configured to transition from the pending wake-up on state to the full-off state after sending out the data link signal and failing to detect a first received data signal within the first period determined by the second timing circuit.

9. The transceiver power consumption regulator of claim 7, wherein the transceiver state machine is further configured to transition from the pending wake-up on state to the full-off state after sending out the data link signal, detecting the first received data signal in response to the data link signal within the first period determined by the second timing circuit, and failing to detect a second received data signal after detecting the first received data signal within the second period determined by the second signal timing circuit.

10. The transceiver power consumption regulator of claim 7, wherein the data receiver detects a received data signal by comparing a signal received from the communications network with a reference signal and determining a magnitude of the signal received from the communications network exceeds a magnitude of the reference signal.

11. The transceiver power consumption regulator of claim 7, wherein the transceiver state machine is further configured to transition from the full-off state to the full-on state after detecting a first received data signal within a period determined by a first timing circuit, waiting for a stand-by period of time determined by a third timing circuit, and detecting a second received data signal after the stand-by period but before a period determined by a fourth data timing circuit.

12. The transceiver power consumption regulator of claim 7, wherein the transceiver state machine is further configured to remain in the full-off state after detecting a first received data signal within a period determined by a first timing circuit, waiting for a stand-by period determined by a third timing circuit, and failing to detect a second received data signal after the stand-by period but before a period determined by a fourth data timing circuit.

* * * * *